United States Patent Office 3,416,621
Patented Dec. 17, 1968

3,416,621
ACOUSTIC WAVE PRODUCING DEVICE
Mikhail Ivanovich Balashkand, Akademicheskaya ul. 8, kv. 13, Monino, Moskovskoi oblasti, U.S.S.R.; Georgy Stepanovich Evdokimov, Novoselskoe shosse, 35a, kv. 48, Ramenskoe, Moskovskoi oblasti, U.S.S.R; Berta Lvovna Kaplan, ulitsa Vorontsovskaya, 24/6, kv. 12, Moscow, U.S.S.R.; Sergei Alexandrovich Lovlya, 1 Radiatorskaya, 97, kv. 2, Moscow, U.S.S.R.; Leonid Nikolaevich Solodilov, ul. Studencheskaya, 32, kv. 145, Moscow, U.S.S.R., and Oleg Lanfanovich Chen, Podolsky raion, p. Vostryakovo, 1 Sadovaya ulitsa, 2, Moskovskaya oblasti, U.S.S.R.
Filed Mar. 6, 1967, Ser. No. 620,959
3 Claims. (Cl. 181—.5)

ABSTRACT OF THE DISCLOSURE

A device for producing acoustic waves for use in marine seismic surveying. The underwater multiple high power pulse emiter utilizes the energy of either highly compressed non-explosive gas, or of an explosive gas mixture when ignited. A reciprocating stepped piston controls the emission of the gas into the fluid media. In the case of the non-explosive gas, high-pressure gas is abruptly emitted from the device to produce an acoustic wave. When utilizing the explosive gas, high-pressure explosive gas is emitted into the fluid media and then ignited.

This invention relates to devices for exciting acoustic waves and, more particularly, to devices for exciting acoustic waves in a liquid medium for marine seismic prospecting.

Employed nowadays are devices for exciting acoustic waves in liquid medium with compressed gas being recurrently discharged into said medium through a discharge orifice from a pressure chamber.

However, disadvantages of the above-mentioned devices lie in that only explosive gas mixture are used which, in itself, is fraught with operational hazard, pulses generated are of low repetition frequency and insufficient stability, and the size and weight of said devices have to be considerably increased to generate high power pulses which is an obstacle to the operation of said devices under sea conditions.

It is, therefore, an object of this invention to provide a device for exciting acoustic waves in liquid medium which enable non-explosive gas to be used.

It is another object of this invention to provide a device for exciting acoustic waves in liquid medium which will insure higher frequency and stability of pulses generated.

It is still another object of this invention to provide a device for exciting acoustic waves in liquid medium, said devices possessing small weight and size and being convenient in operation, even when it is necessary to generate high power pulses.

With these and other objects in view in a device for exciting acoustic waves in liquid medium with compressed gas being recurrently discharged into said medium through a discharge orifice from a pressure chamber, according to the invention, the pressure chamber is provided with a piston furnished with a means for shutting off the discharge orifice of said chamber, said piston being step-shaped and actuated by a pressure means on the side opposite to that of the abovesaid shutting off means.

Other objects and advantages will be clearly understood from the following detailed description and exemplary embodiments thereof, reference being made to the accompanying drawings, wherein.

Figure 1:
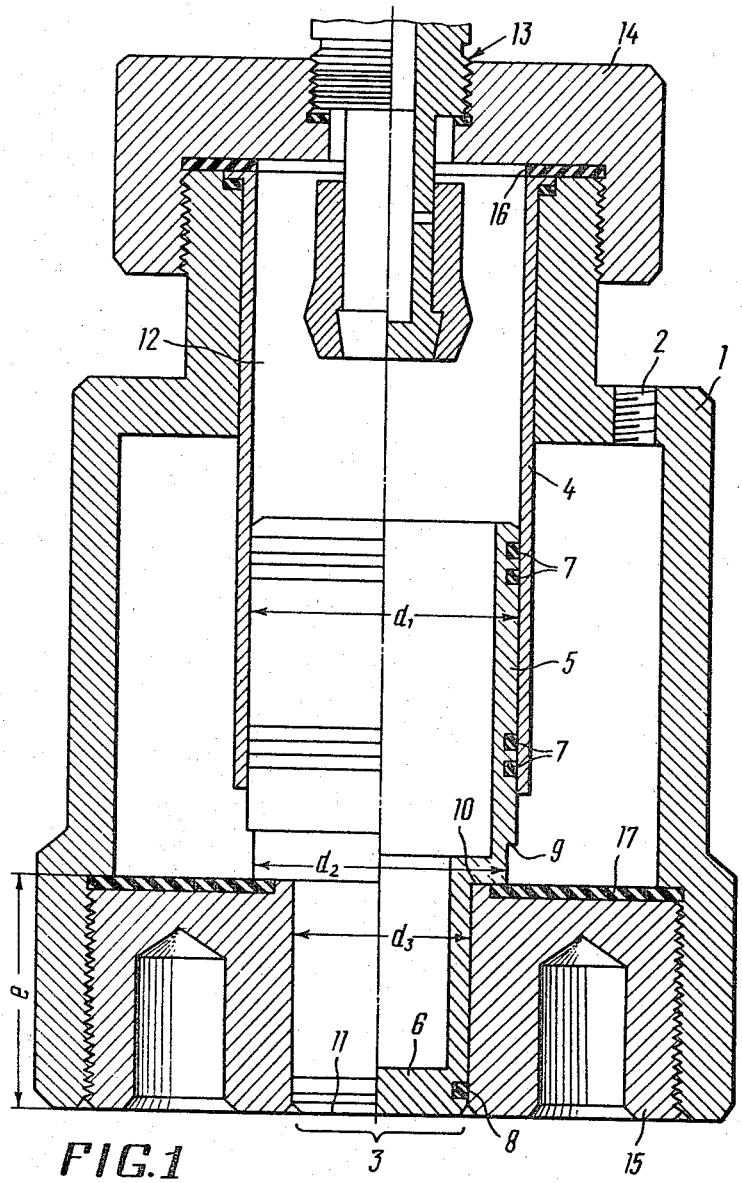
FIG. 1 is an embodiment of the invention wherein non-explosive gases are used (longitudinal sectional view)

According to the first embodiment (FIG. 1) the device of the present invention comprises a pressure chamber 1 with an admission orifice 2 and a discharge orifice 3.

The admission orifice 2 communicates with a high pressure gas source via hoses (not shown in the drawing).

For the sake of convenience the pressure chamber 1 will hereinafter be called the high pressure chamber or chamber.

The chamber 1 is recurrently filled with a non-explosive gas through the orifice 2.

A cylinder 4 provided with a hollow piston being filled with fluid up to the upper edge and provided with means which shuts off the discharge orifice 3 of the chamber 1, said means being essentially a plug 6. The fluid serves as lubricant.

The piston 5 is provided with elastic piston rings 7 and 8 and is step-shaped with three steps 9, 10 and 11.

The piston 5 is actuated by pressure means on the side opposite to that of the plug 6. In the described embodiment of the invention the above-said pressure means is so made that a space 12 of the cylinder 4 communicates with a low pressure non-explosive gas supply source (not shown in the drawing) through an orifice capable of being shut off by a non-return valve 13. The space 12 of the cylinder 4 is recurrently filled with gas through the valve 13.

The chamber 1 is further defined by bases 14 and 15 thread-jointed thereto, and provided with gaskets 16 and 17.

Figure 2:
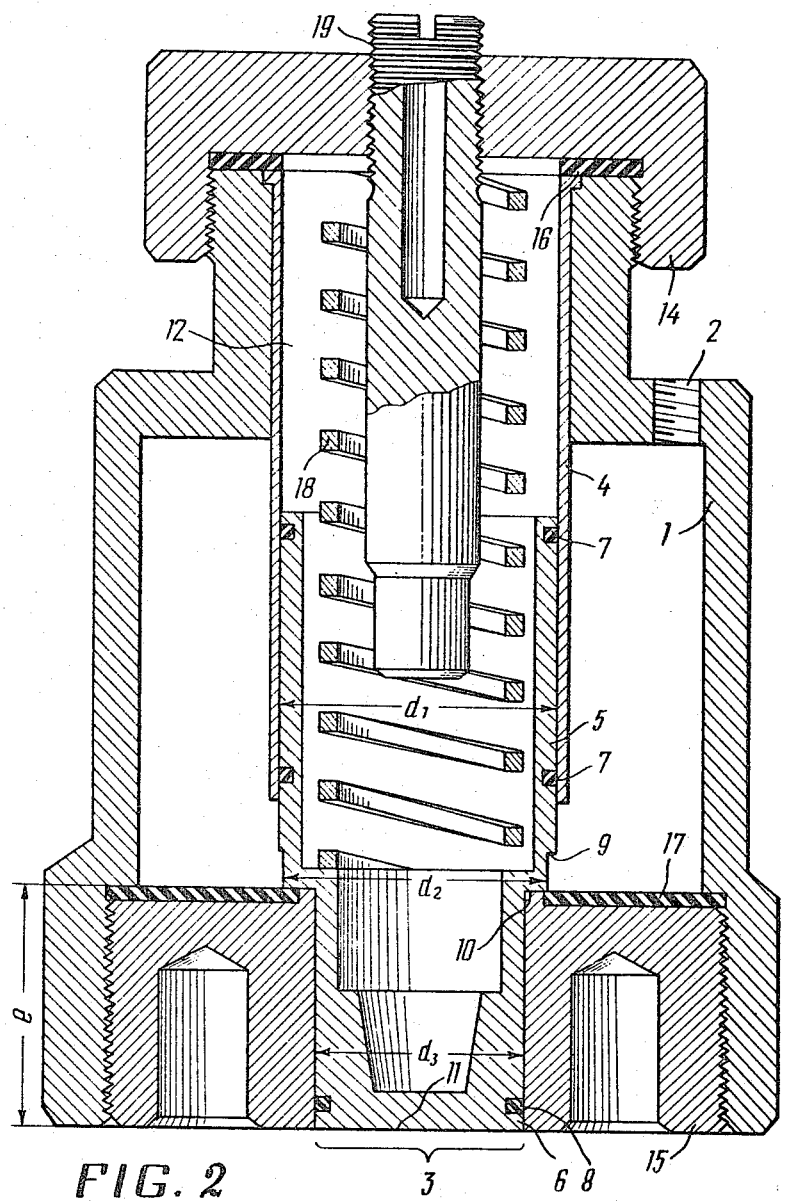
FIG. 2 is another embodiment of the invention wherein non-explosive gases are used (longitudinal sectional view)

According to the second embodiment of the invention (FIG. 2), means capable of exerting pressure upon the piston 5, is shown as spring 18; and to cushion the striking of the piston 5 against the base 14 when said piston travels upwards, a heavy rod 19 is mounted on the base 14, said rod capable of being introduced into the fluid filled piston 5.

The chamber 1 is recurrently supplied with non-explosive gas as is the case in the above-described embodiment of FIG. 1.

Figure 3:
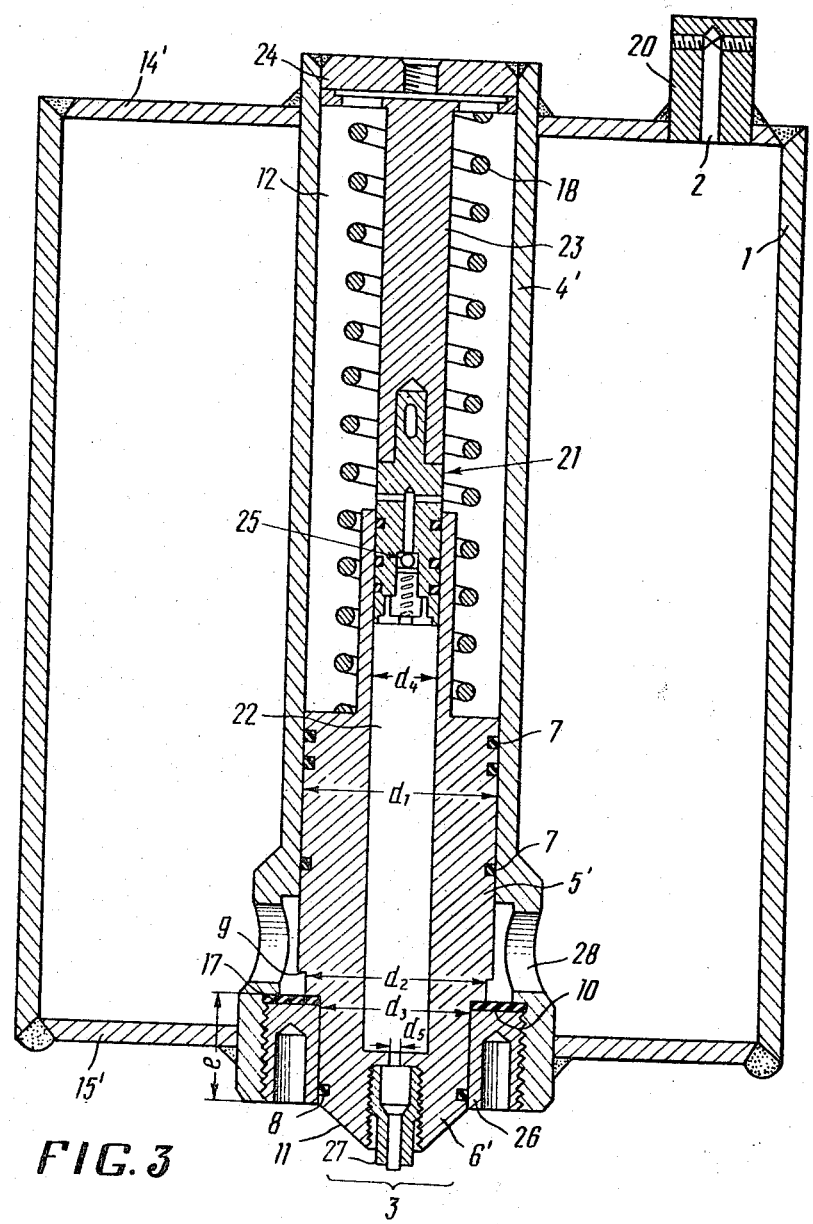
FIG. 3 is still another embodiment of the invention wherein an explosive gas mixture is used (longitudinal sectional view).

According to the third embodiment of the invention (FIG. 3) a chamber 1 enclosed by bases 14' and 15', is recurrently filled with an explosive gas mixture through a T-piece 20 and admission orifice 2 located on the upper base 14'. The explosive gas mixture, such as an air-propane mixture, is supplied from a high pressure gas supply source (not shown in the drawing).

A space 12 of cylinder 4' accommodates a means 21 for igniting the explosive gas mixture, such as air-propane mixture, which is recurrently supplied to the space 12 from a low pressure gas supply source (not shown in the drawing).

A through passageway 22 is made in the piston 5', said passageway running through a plug 6'.

The means 21 for igniting the explosive gas mixture comprises an auxiliary piston 23 fastened to a top closure 24 of the cylinder 4' and a non-return valve 25 fastened to said piston 23 and being capable of shutting off the passageway 22 of the piston 5' to prevent the explosive gas mixture from coming back into the space 12 of the piston 4' from the passageway 22.

The cylinder 4' is provided with a threaded bottom closure 26.

The principle of operation of the device of FIG. 1 is as follows.

A non-explosive gas is supplied to the chamber 1 through the admission orifice 2 via hoses from the high pressure gas supply source, such as a compressor, which develops a pressure of 200–500 atm. and is installed on board the ship.

The non-explosive gas under a pressure of 5–10 atm. which is maintained constant while the chamber 1 is being filled with gas, is supplied to the space 12 of the cylinder 4 through the non-return valve 13 from the low pressure gas supply source also installed on board the ship. The gas pressure inside the chamber 1 increases according to the relationship $P_1 d_1^2 \geqslant P_2(d_1^2 - d_2^2)$, where, throughout the three embodiments:

$P_1$ is gas pressure in the space 12 of the cylinder 4;
$P_2$ is gas pressure inside the chamber 1;
$d_1$ is the outer diameter of the piston 5 above step 9;
$d_2$ is the outer diameter of the piston 5 between steps 9 and 10.

When the pressure $P_2$ increases inside the chamber 1 to reach the value of $P'_2$, the correlation of forces acting upon the piston 5 can be expressed by the relationship $P_1 d_1^2 < P'_2(d_1^2 - d_2^2)$ and the piston 5 starts traveling from its bottommost position upwards. This exposes the step 10 of the piston 5, which causes abrupt changes in the balance of forces acting upon the piston 5, for when step 10 is exposed high pressure gas acts upon both the steps 9 and 10 of the piston 5 with the result that the piston 5 starts traveling upwards with greater acceleration.

Through the region $l$ of the piston stroke, where $l$ represents the length of the plug 6, piston 5 is accelerated, whereupon the discharge orifice 3 opens and the non-explosive gas maintained under high pressure inside the chamber 1 escapes through the orifice 3 into the liquid medium. This results in a pressure drop inside the chamber 1.

The time interval during which the discharge orifice 3 is kept open is $10^{-4}$ sec. or less, which insures generation of pulses in the liquid medium with a sharp demarcation of increased pressure, said pulses being the source of the acoustic waves in said medium.

The piston 5 keeps moving upwards for a distance equal to $\tfrac{1}{4} d_3$, where $d_3$ is the outer diameter of the plug 6. As the piston 5 moves further up, the compression of the low pressure gas in the cylinder 4 causes the piston 5 to decelerate. Upon the dropping of the pressure inside the chamber 1, the piston 5 starts traveling downwards. As soon as the ring 8 of the plug 6 enters the discharge orifice 3 of the chamber 1, the pressure inside said chamber begins to increase.

The piston 5 while traveling downwards within the region $l$, is influenced by the decelerating force, which reaches the value of $0.25\pi P_2(d_1^2 - d_3^2) - 0.25\pi P_1 d_1^2$ before a complete stop of the piston 5 in its bottommost position.

Upon the stopping of the piston 5 in the bottommost position, the entire operation cycle is repeated.

Evaluation of the relationship between the pressure inside the chamber 1 and the space 12 of the cylinder 4, and the values of $d_1$, $d_2$, $d_3$, and $l$, as well as the discharges per second of the gas supplied to the chamber 1, enables the gas to be discharged into the liquid medium for a period of $10^{-4}$ sec. or less.

The operation of the device of the second embodiment is analogous to that of the first embodiment, the only difference being that in the device of the second embodiment the non-explosive low pressure gas is not supplied to the space 12 of the cylinder 4. When the piston 5 moves upwards, the heavy rod 19 is introduced into the fluid which fills the piston 5. This causes said piston to decelerate, thus cushioning its strike against the base 14.

The piston 5 is returned to its bottom position by means of a spring 18 which exerts the force F upon said piston.

The piston 5 is kept in the bottommost position according to the relationship $F \geqslant 0.25\pi P_2(d_1^2 - d_2^2)$.

The principle of operation of the device of the third embodiment is as follows.

Explosive air-propane gas mixture is supplied to the space 12 of the cylinder 4' from a low pressure gas supply source, the pressure $P_1$ equal to 3–4 atm. being maintained in said space until the piston 5' starts traveling upwards. When the pressure in the space 12 reaches the value of 3–3.5 atm. the non-return or check valve 25 starts bleeding the explosive gas mixture, which is capable of filling the passageway 22 of the piston 5'.

Air and propane, the components of the explosive gas mixture, are supplied to the T-piece 20 via separate hoses from the high pressure gas supply source. Mixing of said components takes place in the T-piece 20 wherefrom the explosive gas mixture is supplied to the high pressure chamber 1 through the orifice 2. The piston 5' occupies the bottommost position while pressure $P_2$ of the explosive gas mixture inside the chamber 1 is increased according to the relationship $$0.25\pi P_2(d_1^2 - d_2^2) \leqslant F + 0.25\pi P_1(d_1^2 - d_4^2)$$

where,

F is the force exerted by the spring 18 upon the piston 5'; and $d_4$ (FIG. 3) is the diameter of the passageway 22 of the piston 5'.

Thus, the device is ready to operate.

Then the explosive gas mixture from the space 12 of the cylinder 4' is discharged into the atmosphere and the non-return valve 25 precludes the escape of the explosive gas mixture from the passageway 22 of the piston 5'. This decreases the forces acting downwardly upon the piston 5' and said piston 5' travels upwards somewhat, thus exposing the step 10, and the forces acting upwardly upon the piston 5' sharply increase. When the piston 5' travels within the stroke region $l$, the piston 5' is accelerated. The piston 5', having traveled over said distance, the discharge orifice 3 opens and the explosive gas mixture is discharged into the fluid medium, thus creating a gas cloud.

The discharge of the gas mixture is carried out during a predetermined period of from 0.01–0.1 sec.

When the piston 5' moves further up, the auxiliary piston 23 develops adiabatic compression of the explosive gas mixture in the passageway 22 with the result that the ignition temperature of the explosive gas mixture is obtained. Burning is transferred to a tube 27 through a narrow section of the passageway 22 of the diameter $d_5$, in which tube detonation occurs.

The relations between the diameters $d_4$ and $d_5$ and speed of the piston 5' are so selected that detonation of the explosive gas mixture will occur in the tube 27.

As soon as the gas cloud assumes its shape, detonation is transferred to said gas cloud through the tube 27. Burning is likewise propagated through the explosive gas mixture in backward direction to the chamber 1 through orifices 28 of the cylinder 4' with the resultant detonation of the explosive gas mixture in said chamber 1. When the pressure inside the chamber 1 drops, the spring 18 makes the piston 5' return to its bottommost position. The products left in the chamber 1 after detonation amount to 1–2% and will not affect detonation of the explosive gas mixture in the following cycle.

Then the operation cycle is repeated.

In describing the embodiments of the invention under consideration narrow specific terminology is used for the sake of clarity. However, the invention is not to be restricted to this specific terminology having but a narrow meaning, and it should be borne in mind that each such term covers all the equivalent elements functioning in a similar way and used for solving the same problems.

What is claimed is:

1. A device for producing acoustic waves in a liquid medium which comprises a pressure chamber provided with an admission and a discharge orifice, a compressed gas is periodically caused to emerge into said liquid medium via said discharge orifice; a cylinder disposed in said pressure chamber, the cavity of said cylinder communicating via a closable orifice with a low-pressure gas source; a stepped piston housed in said cylinder and acted upon by said low-pressure gas; a means of closing said discharge orifice; a means of igniting an explosive gaseous mixture periodically fed to said cylinder cavity, said ignition means being disposed in said cylinder cavity on the side of said piston that is opposite to the location of said means of closing said discharge orifice; a through passage provided in said piston and running through said means of closing said discharge orifice, said through passage adapted to cause the explosive gaseous mixture discharged from said pressure chamber into the liquid medium to detonate.

2. A device according to claim 1, wherein provision is made in the cavity of said cylinder on the opposite side of the piston from said means of closing said discharge orifice, for an elastic spring element, which element exerts additional pressure on said piston.

3. A device according to claim 2, wherein said means of igniting the explosive gaseous mixture comprises an auxiliary piston mounted on the top closure of said cylinder and enters said through passage of said piston when said piston moves upwards, thereby causing an adiabatic compression of said explosive gaseous mixture, and a check valve is affixed to said auxiliary piston and serves to shut off said passage of said piston in order to check the backward flow of said explosive gaseous mixture from said passage of said piston to the cavity of said cylinder, said check valve being disposed to the side of said piston that is opposite to the side of mounting said means of closing said discharge orifice.

References Cited

UNITED STATES PATENTS

| | | | |
|---|---|---|---|
| 3,249,177 | 5/1966 | Chelminski | 181—.5 |
| 3,276,534 | 10/1966 | Ewing et al. | |
| 3,289,784 | 12/1966 | Cassand et al. | |
| 3,207,285 | 3/1967 | Wells | 340—3 |
| 3,322,232 | 5/1967 | Chalmers et al. | 181—.5 |

BENJAMIN A. BORCHELT, *Primary Examiner.*

J. FOX, *Assistant Examiner.*

U.S. Cl. X.R.

43—4.5; 340—3, 7